US012770524B2

(12) United States Patent
Matsumoto et al.

(10) Patent No.: US 12,770,524 B2
(45) Date of Patent: Oct. 20, 2026

(54) INFORMATION PROCESSING DEVICE AND DISPLAY CONTROL METHOD

(71) Applicant: Rakuten Group, Inc., Tokyo (JP)

(72) Inventors: Asaki Matsumoto, Tokyo (JP); Takayoshi Inuma, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 70 days.

(21) Appl. No.: 18/762,878

(22) Filed: Jul. 3, 2024

(65) Prior Publication Data

US 2025/0022377 A1 Jan. 16, 2025

(30) Foreign Application Priority Data

Jul. 10, 2023 (JP) ................................ 2023-113265

(51) Int. Cl.

*G08G 5/22* (2025.01)
*G08G 5/26* (2025.01)
*G08G 5/72* (2025.01)

(52) U.S. Cl.

CPC ................. *G08G 5/22* (2025.01); *G08G 5/26* (2025.01); *G08G 5/72* (2025.01); *G08G 5/727* (2025.01)

(58) Field of Classification Search

CPC .. G08G 5/22; G08G 5/26; G08G 5/72; G08G 5/727; G08G 5/56; B64U 2201/20

USPC .................................................. 701/418, 457

See application file for complete search history.

(56) References Cited

U.S. PATENT DOCUMENTS

2004/0143393 A1* 7/2004 Knecht .................... G08G 5/80 340/961
2009/0118998 A1* 5/2009 Chau ...................... G06Q 30/00 705/14.27
2015/0142211 A1* 5/2015 Shehata ................... G08G 5/57 701/2
2016/0117853 A1* 4/2016 Zhong .................... B64U 30/20 345/634
2022/0084416 A1* 3/2022 Maddanimath ........ G08G 5/727
2022/0415188 A1* 12/2022 Zhang ...................... G08G 5/34

FOREIGN PATENT DOCUMENTS

JP 2017-509520 A 4/2017
WO WO-2023040985 A1 * 3/2023 ........... G06F 16/904

* cited by examiner

*Primary Examiner* — Abby J Flynn
*Assistant Examiner* — Leah N Miller
(74) *Attorney, Agent, or Firm* — Sughrue Mion, PLLC

(57) ABSTRACT

An UAV monitoring server causes a base object of an UAV base to be displayed on a two-dimensional map screen, and also causes, based on an operation status of each of a plurality of UAVs, information indicating the UAV in flight standby, take-off operation, or landing operation at the UAV base and information indicating the UAV in flight outside the UAV base to be displayed in a different display mode on the two-dimensional map screen.

6 Claims, 14 Drawing Sheets

INFORMATION PROCESSING DEVICE AND DISPLAY CONTROL METHOD

CROSS REFERENCE TO RELATED APPLICATION

This application claims priority from Japanese Patent Application No. 2023-113265 which was filed on Jul. 10, 2023, the disclosure of which is herein incorporated by reference in its entirety.

TECHNICAL FIELD

One or more embodiments of the present invention relate to a technical field of a system that enable proper monitoring of an operating status of an unmanned aerial vehicle by displaying information indicating the unmanned aerial vehicle on a map screen.

RELATED ART

Conventionally, as disclosed in, for example, JP 2017-509520 A, a system in which an icon indicating an unmanned aerial vehicle in flight, a flight route of the unmanned aerial vehicle, and a base for take-off and landing of the unmanned aerial vehicle are displayed on a map screen of a display of a remote terminal, is known. This allows a user of the remote terminal to effectively monitor a flight status of the unmanned aerial vehicle in flight.

By the way, when one monitor (user) manages an operation of a plurality of the unmanned aerial vehicles while looking at a map screen, it is desirable to display, on the map screen, not only information indicating the unmanned aerial vehicle in flight, but also information indicating the unmanned aerial vehicle (for example, the unmanned aerial vehicle in flight standby) existing at a base having a take-off and landing port. However, since there is a high possibility that the plurality of the unmanned aerial vehicles simultaneously exist at the base, if the information indicating the unmanned aerial vehicle existing at the base is displayed in the same way as the information indicating the unmanned aerial vehicle in flight, this becomes complicated for the monitor and makes it difficult for the monitor to grasp the operating status of each of the unmanned aerial vehicles.

Therefore, one or more embodiments of the present invention are to providing an information processing device and a display control method that allow a monitor to easily grasp, on a map screen, operating statuses of the unmanned aerial vehicle in flight and the unmanned aerial vehicle existing at the base.

SUMMARY (An aspect 1) In response to the above issue, an information processing device includes: at least one memory configured to store program code; and at least one processor configured to access the program code and operate as instructed by the program code. The program code includes: first acquisition code configured to cause the at least one processor to acquire first position information indicating a position of a base used for take-off or landing of an unmanned aerial vehicle; second acquisition code configured to cause the at least one processor to acquire second position information indicating a position of each of a plurality of unmanned aerial vehicles; third acquisition code configured to cause the at least one processor to acquire operating status information indicating an operating status of each of the plurality of unmanned aerial vehicle; and display control code configured to cause the at least one processor to cause an object representing the base to be displayed on a two-dimensional map screen on the basis of the first position information, and to cause information indicating each of the plurality of unmanned aerial vehicles to be displayed on the two-dimensional map screen on the basis of the second position information. The display control code is configured to cause the at least one processor to further cause, based on the operating status information of each of the plurality of unmanned aerial vehicle, first vehicle information and second vehicle information to be displayed in different display modes, the first vehicle information indicating the unmanned aerial vehicle in flight standby, take-off operation, or landing operation at the base, and the second vehicle information indicating the unmanned aerial vehicle in flight outside the base.

(An aspect 2) A display control method executed by one or more computers, includes: acquiring first position information indicating a position of a base used for take-off or landing of an unmanned aerial vehicle; acquiring second position information indicating a position of each of a plurality of unmanned aerial vehicles; acquiring operating status information indicating an operating status of each of the plurality of unmanned aerial vehicle; displaying an object representing the base on a two-dimensional map screen on the basis of the first position information; and displaying, based on the second position information and the operating status information of each of the plurality of unmanned aerial vehicle, first vehicle information and second vehicle information in different display modes, the first vehicle information indicating the unmanned aerial vehicle in flight standby, in take-off operation, or landing operation at the base, and the second vehicle information indicating the unmanned aerial vehicle in flight outside the base.

DETAILED DESCRIPTION

Hereinafter, one or more embodiments of the present invention will be described with reference to the drawings. The following embodiment is an embodiment in a case where the present invention is applied to an UAV (Unmanned Aerial Vehicle) monitoring system for monitoring an operating status of the UAV such as a drone or a multi-copter.

[1. Configuration and Operation Outline of UAV Monitoring System S]

Figure 1:
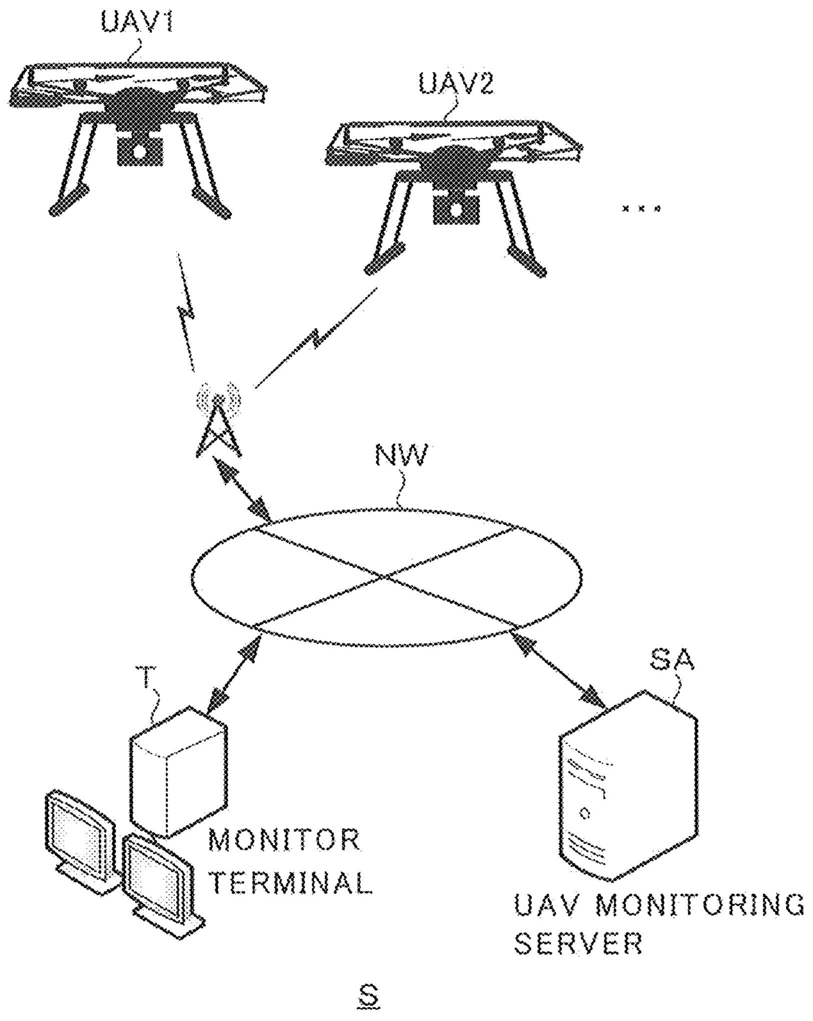
FIG. 1 is a diagram illustrating a schematic configuration example of an UAV monitoring system S.

First, a configuration and operation outline of an UAV monitoring system S according to the present embodiment will be described with reference to FIG. 1. FIG. 1 is a diagram illustrating a schematic configuration example of the UAV monitoring system S. As illustrated in FIG. 1, the UAV monitoring system S includes a plurality of UAVs n (n=1, 2, . . . ), an UAV monitoring server SA, a monitor terminal T, and the like. Here, the UAV monitoring server SA is an example of the information processing device (apparatus). The UAVs n, the UAV monitoring server SA, and the monitor terminal T are respectively connected to a communication network NW. The communication network NW includes, for example, the Internet, a mobile communication network and a radio base station thereof, and the like.

The UAV n is, for example, controlled to depart from a take-off and landing port for a predetermined purpose such as transporting (e.g., delivering) of an article, measuring, or the like, and to return to the take-off and landing port or another take-off and landing port. A base having the take-off and landing port used for taking off or landing of the UAV n is called an UAV base. The UAV base includes, for example, a site (or rooftop of a building) having an area at least as large as the area of the take-off and landing port. The UAV base may include a predetermined range above the site (or the rooftop of the building).

The monitor terminal T is used by a monitor of the plurality of UAVs n. The monitor may also, as an operator, give an operation instruction (e.g., take-off instruction) to the UAV n from the monitor terminal T. Operation instruction information indicating the operation instruction for the UAV n is transmitted to the UAV monitoring server SA via the communication network NW along with a vehicle ID of the UAV n. Incidentally, a staff stays to perform a flight preparation of the UAV n at the UAV base. The flight preparation of the UAV n includes, for example, a pre-flight inspection of the UAV n. When the flight preparation of the UAV n is completed, readiness Information (preparation completion information) indicating the completion of the flight preparation of the UAV n may be transmitted from the mobile terminal of the staff at the UAV base to the UAV monitoring server SA via the communication network NW along with the vehicle ID of the UAV n.

[1-1. Configuration and Function of UAV n]

Figure 2:
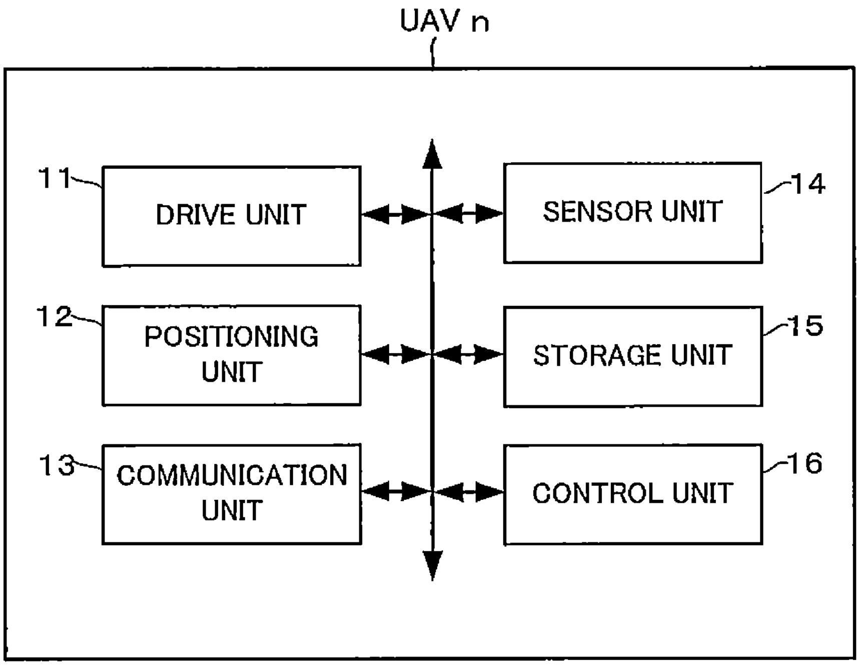
FIG. 2 is a diagram illustrating a schematic configuration example of an UAV n.

Next, a configuration and a function of the UAV n will be described with reference to FIG. 2. FIG. 2 is a diagram illustrating a schematic configuration example of the UAV n. As illustrated in FIG. 2, the UAV n includes a drive unit 11, a positioning unit 12, a communication unit 13, a sensor unit 14, a storage unit 15, a control unit 16, and the like. Moreover, although not shown, the UAV n includes a battery that supplies power to each unit of the UAV n, and a rotor (propeller) that is a plurality of horizontal rotary blades (wings). The power of the battery is supplied to each unit of the UAV n when a power switch provided on the UAV n is turned on. The power switch may be turned on by the staff at the UAV base, or may be turned on by receiving a power-on signal from an external device. Incidentally, the UAV n may include a holding member or the like that holds the article to be loaded. Furthermore, the UAV n may be provided with a linear member such as a wire connected to the holding member, and a reel (winch) for feeding out or winding the linear member.

The drive unit 11 includes a motor, a rotation shaft, and the like. The drive unit 11 rotates a plurality of rotors by the motor, the rotation shaft, and the like that are driven in accordance with a control signal output from the control unit 16. The positioning unit 12 includes a radio wave receiver, an altitude sensor, and the like. The positioning unit 12 receives, for example, a radio wave transmitted from a GNSS (Global Navigation Satellite System) satellite by the radio wave receiver, and detects a current position (latitude and longitude) of the UAV n in a horizontal direction on the basis of the radio wave. Incidentally, the current position of the UAV n in the horizontal direction may be corrected on the basis of an image captured by a camera of the sensor unit 14. Position information indicating the current position detected by the positioning unit 12 is output to the control unit 16. Furthermore, the positioning unit 12 may detect a current position (altitude) of the UAV n in a vertical direction by the altitude sensor such as an atmospheric pressure sensor. In this case, the position information output to the control unit 16 indicates the horizontal position and the vertical position of the UAV n.

The communication unit 13 has a wireless communication function and controls communication performed via the communication network NW. The sensor unit 14 includes various sensors used for flight control and the like of the UAV n. The various sensors include, for example, an optical sensor, a speed sensor, a triaxial angular velocity sensor, a triaxial acceleration sensor, a geomagnetic sensor, and the like. The optical sensor is configured to include a camera (for example, an RGB camera, an infrared camera), and continuously captures images of real space that falls within an angle of view of the camera. Sensing information obtained by the sensing of the sensor unit 14 is output to the control unit 16. The storage unit 15 includes a nonvolatile memory or the like, and stores various programs and data. Moreover, the storage unit 15 stores a vehicle ID of UAV n. The vehicle ID is identification information for identifying each UAV n.

The control unit 16 includes at least one CPU (Central Processing Unit), a ROM (Read Only Memory), a RAM (Random Access Memory), and the like, and executes various types of control according to programs stored in the ROM or the storage unit 15. Various controls include flight control (including take-off control and landing control). In the flight control, the control unit 16 controls the rotation speed of the rotor, the position of UAV n, the attitude of UAV n, and traveling direction of UAV n by using the position information acquired from the positioning unit 12, the sensing information acquired from the sensor unit 14, flight path (flight route) information, and the like. This allows the control unit 16 to fly the UAV n autonomously.

Here, the flight path information is obtained, for example, from the UAV monitoring server SA. The flight path information includes, for example, location information indicating the positions of a plurality of waypoints on the flight path of the UAV n. The location of the waypoint is represented, for example, by a horizontal position (latitude and longitude). Alternatively, the location of the waypoint may be represented, for example, by a horizontal position (latitude and longitude) and a vertical position (altitude). Incidentally, in a case where the UAV n is used for delivery of the article, the flight path information includes position information of delivery destination of the article. Furthermore, the control unit 16 can also perform flight control of the UAV n in accordance with control information from the UAV monitoring server SA. The control information includes, for example, control information for taking off the UAV n at the UAV base, or control information for landing the UAV n at the UAV base.

Moreover, the control unit 16 acquires direction information indicating a front (front face) direction (i.e., traveling direction) of the UAV n, the position information indicating the position of the UAV n, and speed information indicating a speed (i.e., flight speed) of the UAV n. The direction information, the position information, and the speed information thus acquired are successively transmitted to the UAV monitoring server SA by communication unit 13, along with the vehicle ID of the UAV n. Here, the front direction of the UAV n is identified, for example, based on the sensing information from the triaxial acceleration sensor and the geomagnetic sensor included in the sensor unit 14. The front direction of UAV n means, for example, the direction (azimuth) that a front face of UAV n faces. The front face is not limited to a flat face, but may be a curved face. The front face of the UAV n is a face facing the traveling direction (i.e., a face that receives a headwind) of the UAV n, and is predetermined. The front direction of the UAV n is represented, for example, as eastward, westward, southward, northward, eastwestward, or southeastward in a two-dimensional plane. Alternatively, the front direction of the UAV n may be represented by an angle with respect to north (i.e., an angle based on the north) in the two-dimensional plane.

Incidentally, the speed of the UAV n is identified, for example, based on the speed information from the speed sensor included in the sensor section 14. Moreover, image information indicating the images captured by the camera may be successively transmitted to the UAV monitoring server SA by the communication unit 13, along with the vehicle ID of the UAV n. Moreover, when the UAV n is powered on, power-on information indicating the power-on may be transmitted to the UAV monitoring server SA by the communication unit 13, along with the vehicle ID of the UAV n. Moreover, rotor starting information indicating that the rotor of UAV n has started to rotate may be successively transmitted to the UAV monitoring server SA by communication section 13, along with the vehicle ID of UAV n. Moreover, rotor stop information indicating that rotation of the rotor of the UAV n has stopped may be successively transmitted to the UAV monitoring server SA by communication section 13, along with the vehicle ID of UAV n.

[1-2. Configuration and Function of UAV Monitoring Server SA]

Figure 3:
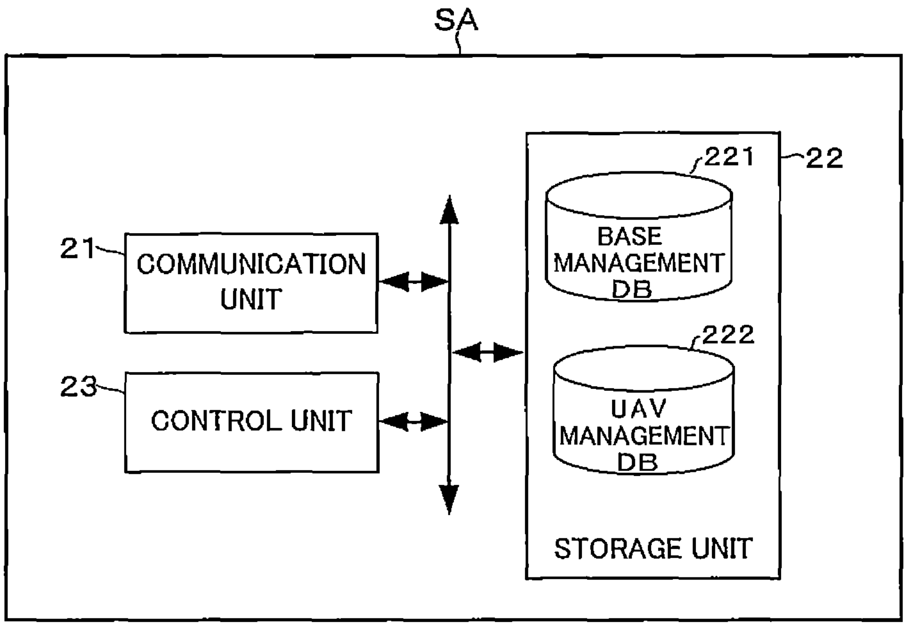
FIG. 3 is a diagram illustrating a schematic configuration example of the UAV monitoring server SA.

Next, a configuration and a function of the UAV monitoring server SA will be described with reference to FIG. 3. FIG. 3 is a diagram illustrating a schematic configuration example of the UAV monitoring server SA. As illustrated in FIG. 3, the UAV monitoring server SA includes a communication unit 21, a storage unit 22, a control unit 23, and the like. The communication unit 21 controls communication performed via the communication network NW. The position information, the direction information, the speed information, the power-on information, and the like that are transmitted from the UAV n are received by the communication unit 21. Moreover, the operation instruction information and the like that are transmitted from the monitor terminal T are received by the communication unit 21. Moreover, the readiness Information and the like that are transmitted from the mobile terminal of the staff of the UAV base are received by the communication unit 21. The storage unit 22 includes, for example, a hard disk drive (HDD) or a solid state drive (SSD), and stores various programs including an operating system (OS).

The storage unit 22 stores data constituting a two-dimensional map screen in which two-dimensional map image data is incorporated. The data constituting the two-dimensional map screen is provided to the monitor terminal T. As a result, the two-dimensional map screen is displayed on a display of the monitor terminal T. Moreover, the storage unit 22 stores data of elements (for example, objects, figures, etc. to be described later) to be displayed on the two-dimensional map screen. Moreover, the storage unit 22 stores data constituting an operation screen for receiving an operation instruction to the UAV n from the monitor. The data constituting the operation screen is provided to the monitor terminal T. As a result, the operation screen is displayed on the display of the monitor terminal T. Incidentally, the storage unit 22 includes a buffer memory that stores the position information, the direction information, and the speed information that are received from the UAV n in association with the vehicle ID of the UAV n for each UAV n. In the buffer memory, the position information, the direction information, and the speed information are updated successively.

Furthermore, a base management database (DB) 221, an UAV management database (DB) 222 and the like are constructed in the storage unit 22. The base management database 221 is a database for managing information on the UAV base. In the base management database 221, for example, a base ID of the UAV base, the position information of the UAV base, and the like are stored in association with each UAV base. The base ID is identification information for identifying the base. The position information of the UAV base indicates, for example, the position (latitude and longitude) of any point (which may be a plurality of points) in the UAV base.

The UAV management database 222 is a database for managing information on the UAV n to be monitored. In the UAV management database 222, for example, the vehicle ID, the flight path information, the operating status information of the UAV n to be monitored, and the like are stored in association with each UAV n. Here, the operating status information indicates an operating status (in other words, working situation) of the UAV n. The operating status indicates, for example, "stopped", "standing by for flight", "operating for take-off", "operating for landing", "flying", or the like. The operating status is updated as appropriate. The "stopped" indicates a situation where the UAV n is at a standstill. For example, the "stopped" indicates a situation where the UAV n is not powered on at the UAV base. The "standing by for flight" indicates a situation where the UAV n is in flight standby. For example, the "standing by for flight" a situation where the UAV n is powered on at the UAV base and is waiting to fly. Alternatively, the "standing by for flight" indicates a situation where the UAV n has completed flight preparations at the UAV base and is waiting to fly. The base ID of the UAV base where the UAV n is in flight standby may be associated with the "standing by for flight". In other words, it is preferable that the base ID be associated with the UAV n that is in flight standby.

The "operating for take-off" indicates a situation where the UAV n is in take-off operation. For example, the "operating for take-off" indicates any of the situations from when the UAV n starts taking off by the rotation of the UAV n's rotor at the UAV base, ascends vertically, and until stops by hovering in the sky above a predetermined altitude. Incidentally, the "altitude" herein is the height from a reference plane, for example, it may be the height from the takeoff/landing port (e.g., the ground or building rooftop surface) that the UAV n is touching. The base ID of the UAV base where the UAV n is in take-off operation may be associated with the "operating for take-off". In other words, it is preferable that the base ID be associated with the UAV n that is in take-off operation. The "operating for landing" indicates a situation where the UAV n is in landing operation. For example, the "operating for landing" indicates any of the situations from when the UAV n that arrived at the UAV base hovers in the sky, descends vertically, lands at the takeoff and landing port, and until the UAV n's rotor stops rotating. The base ID of the UAV base where the UAV n is in landing operation may be associated with the "operating for landing". In other words, it is preferable that the base ID be associated with the UAV n that is in landing operation.

The "flying" indicates a situation where the UAV n is in flight outside the UAV base. Here, "outside the UAV base" means, for example, an area that is horizontally a predetermined distance (for example, 5 m) or more away from the UAV base. Incidentally, the "flying" may include a situation where UAV n is hovering outside the UAV base. Moreover, it is preferable that the base ID of the UAV base is not associated with the UAV n that is in flight. With this configuration, it is possible to determine that the UAV n to which the base ID of the UAV base is not associated, is in flight outside the UAV base.

The control unit 23 includes at least one CPU, a ROM, a RAM, and the like. The control unit 23 includes at least one CPU, a ROM, a RAM, and the like, and performs various processes according to the programs (program code) stored in the storage unit 22 or the ROM, or non-transitory computer readable memory. The CPU (an example of processor) is configured to access the program code stored in the storage unit 22 or the memory and operate as instructed by the program code. The program code includes: first acquisition code configured to cause the CPU to acquire first position information indicating a position of the UAV base used for take-off or landing of the UAV n; second acquisition code configured to cause the CPU to acquire second position information indicating a position of each of a plurality of the UAVs n; third acquisition code configured to cause the CPU to acquire operating status information indicating an operating status of each of the plurality of the UAVs n; and display control code configured to cause the CPU to cause an object representing the UAV base to be displayed on a two-dimensional map screen on the basis of the first position information, and to cause information indicating each of the plurality of the UAVs n to be displayed on the two-dimensional map screen on the basis of the second position information. Then, the display control code is configured to cause the CPU to further cause, based on the operating status information of each of the plurality of UAVs n, first vehicle information and second vehicle information to be displayed in different display modes. The first vehicle information indicates the UAV n in flight standby, take-off operation, or landing operation at the UAV base. The second vehicle information indicates the UAV n in flight outside the UAV base. Incidentally, the processor may be implemented using circuitry or processing circuitry which includes general purpose processors, special purpose processors, integrated circuits, ASICs, conventional circuitry and/or combinations thereof which are configured or programmed to perform the disclosed functionality. The processor may be hardware (or a combination of hardware and software) that carry out or are programmed to perform the recited functionality.

Figure 4:
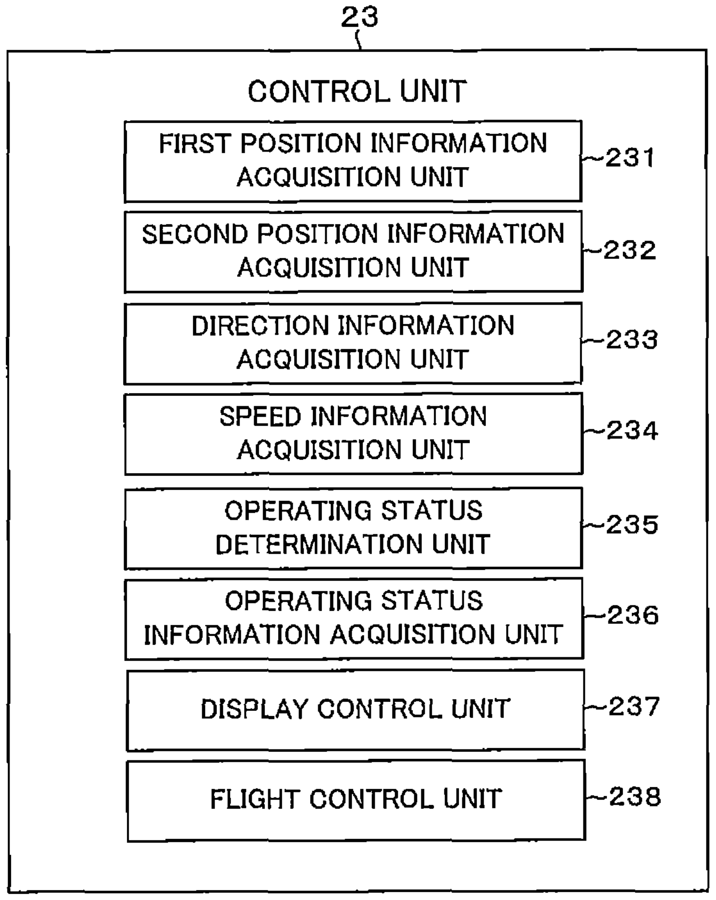
FIG. 4 is a diagram illustrating an example of functional blocks in a control unit 23.

FIG. 4 is a diagram illustrating an example of functional blocks in the control unit 23. For example, in accordance with according to the programs (program code) stored in the storage unit 22 or the ROM, the control unit 23 functions as a first position information acquisition unit 231, a second position information acquisition unit 232, a direction information acquisition unit 233, a speed information acquisition unit 234, an operating status determination unit 235, an operating status information acquisition unit 236, a display control unit 237, a flight control unit 238, and the like, as illustrated in FIG. 4.

The first position information acquisition unit 231 acquires first position information indicating the position of the UAV base to be displayed by an object (also referred to as an icon, hereinafter referred to as a "base object") representing the UAV base from, for example, the base management database 221. Here, the base object is represented by a pattern (picture), a figure, a photograph or the like.

The second position information acquisition unit 232 acquires second position information indicating the position of the UAV n to be monitored. For example, the first position information of the UAV base is acquired as the second position information of the UAV n standing by for flight at the UAV base. Moreover, the second position information of the UAV n operating for take-off (in take-off operation) or operating for landing (in landing operation) at the UAV base is acquired, for example, from the buffer memory in the storage unit 22. Alternatively, the first position information of the UAV base may be acquired as the second position information of the UAV n operating for take-off or operating for landing at the UAV base. Moreover, the second position information of the UAV n flying (in flight) outside the UAV base is acquired, for example, from the buffer memory in the storage unit 22.

The direction information acquisition unit 233 acquires direction information indicating the front direction of the UAV n to be monitored. For example, the direction information of the UAV n operating for take-off or operating for landing at the UAV base is acquired from the buffer memory in the storage unit 22. Moreover, the direction information of the UAV n flying outside the UAV base is acquired from, for example, the buffer memory in the storage unit 22. Incidentally, the direction information acquisition unit 233 may calculate the traveling direction of the UAV n from two different positions of the UAV n. In this case, the direction information acquisition unit 233 acquires the direction information indicating the calculated traveling direction.

The speed information acquisition unit 234 acquires speed information indicating the speed of the UAV n to be monitored. For example, the speed information of the UAV n operating for take-off or operating for landing at the UAV base is acquired from the buffer memory in the storage unit 22. Moreover, the speed information of the UAV n flying outside the UAV base is acquired from, for example, the buffer memory in the storage unit 22. Incidentally, the speed information acquisition unit 234 may calculate the speed of the UAV n on the basis of the amount of change in the position of the UAV n per unit time. In this case, the speed information acquisition unit 234 acquires speed information indicating the calculated speed.

The operating status determination unit 235 determines the operating status of the UAV n to be monitored. Incidentally, when the operating status is determined by the operating status determination unit 235, the operating status information registered in the UAV management database 222 in association with the vehicle ID of the UAV n is updated. For example, when the power-on information is received by the communication unit 21 from the UAV n whose the operating status is stopped, the operating status determination unit 235 determines that the operating status of the UAV n has changed from being stopped to standing by for flight. Alternatively, when the readiness information of the UAV n is received by the communication unit 21 from the mobile terminal of the staff of the UAV base, the operating status determination unit 235 may determine that the operating status of the UAV n has changed from being stopped to standing by for flight.

Moreover, when the operation instruction information indicating the operation instruction (take-off instruction) for the UAV n whose the operating status is in flight standby, is received by the communication unit 21, the operating status determination unit 235 determines that the operating status of the UAV n has changed from standing by for flight to operating for take-off. Here, the operating for take-off (in take-off operation) may be classified into at least a start of take-off, ascending, and hovering (for take-off). Here, the hovering means stopping in the sky of the UAV base. When the operation instruction information indicating the operation instruction (e.g., take-off instruction) to the UAV n, is received by the communication unit 21, the operating status determination unit 235 may determine that the operating status of the UAV n has changed from standing by for flight to the start of take-off. Alternatively, when the rotor starting information indicating that the rotor of the UAV n has started to rotate is received by the communication unit 21, the operating status determination unit 235 may determine that the operating status of the UAV n has changed from standing by for flight to the start of take-off.

Then, when the vertical speed (i.e., the speed in vertical direction) of the UAV n whose the operating status is the start of take-off has become greater than or equal to a first threshold value, the operating status determination unit 235 may determine that the UAV n's operating status has changed from the start of take-off to ascending. Alternatively, when the altitude of the UAV n whose the operating status is the start of take-off has become greater than or equal to a second threshold value, the operating status determination unit 235 may determine that the UAV n's operating status has changed from the start of take-off to ascending. Then, when the vertical speed of the UAV n whose the operating status is ascending has become less than or equal to a third threshold value, the operating status determination unit 235 may determine that the UAV n's operating status has changed from ascending to hovering (for take-off). Alternatively, when the altitude of the UAV n whose the operating status is ascending has reached a fourth threshold value, the operating status determination unit 235 may determine that the UAV n's operating status has changed from ascending to hovering (for take-off).

Moreover, when a distance between the horizontal position of the UAV n (i.e., the UAV n whose the operating status is operating for take-off or hovering) and the position of the UAV base has become greater than or equal to a fifth threshold value, the operating status determination unit 235 may determine that the UAV n's operating status has changed from operating for take-off (or hovering) to frying. Here, the distance is a distance in horizontal direction. The horizontal position is a position in the horizontal direction. An example of the case where the distance is greater than or equal to the fifth threshold includes a case where the UAV n is away from the UAV base by a predetermined distance or more in the horizontal direction. Alternatively, when the horizontal speed (i.e., the speed in horizontal direction) of the UAV n (i.e., the UAV n whose the operating status is operating for take-off or hovering) has become greater than or equal to a sixth threshold value, the operating status determination unit 235 may determine that the UAV n's operating status has changed from operating for take-off (or hovering) to flying.

Moreover, when the operation instruction information indicating the operation instruction (e.g., landing instruction) for the UAV n whose the operating status is in flight is received by the communication unit 21, the operating status determination unit 235 may determine that the operating status of the UAV n has changed from frying to operating for landing. Alternatively, when a distance between the horizontal position of the UAV n (i.e., the UAV n whose the operating status is flying) and the position of the UAV base has become less than or equal to a seventh threshold value, the operating status determination unit 235 may determine that the operating status of the UAV n has changed from flying to operating for landing. Here, the distance is a distance in horizontal direction. The horizontal position is a position in the horizontal direction. An example of the case where the distance is less than or equal to the seventh threshold value includes a case where the UAV n reaches the UAV base.

The operating for landing (in landing operation) may be classified into at least hovering (for landing), descending, and landing. When the operation instruction information indicating the operation instruction (e.g., landing instruction) to the UAV n whose the operating status is frying, is received by the communication unit 21, the operating status determination unit 235 may determine that the operating status of the UAV n has changed from frying to hovering (for landing). Alternatively, when a distance between the horizontal position of the UAV n (i.e., the UAV n whose the operating status is frying) and the position of the UAV base has become greater than or equal to the seventh threshold value, the operating status determination unit 235 may determine that the operating status of the UAV n has changed from frying to hovering (for landing).

Then, when the vertical speed of the UAV n whose the operating status is hovering (for landing) has become greater than or equal to a eighth threshold value, the operating status determination unit 235 may determine that the UAV n's operating status has changed from hovering (for landing) to descending. Alternatively, when the altitude of the UAV n whose the operating status is hovering (for landing) has become less than or equal to a ninth threshold value, the operating status determination unit 235 may determine that the UAV n's operating status has changed from hovering (for landing) to descending. Then, when the vertical speed of the UAV n whose the operating status is descending has become less than or equal to a tenth threshold value, the operating status determination unit 235 may determine that the UAV n's operating status has changed from descending to landing. Alternatively, when the altitude of the UAV n whose the operating status is descending has reached an eleventh threshold value (e.g., the UAV n has reached the ground), the operating status determination unit 235 may determine that the UAV n's operating status has changed from descending to landing. Alternatively, when the rotor stop information indicating that rotation of the rotor of the UAV n has stopped is received by the communication unit 21, the operating status determination unit 235 may determine that the operating status of the UAV n has changed from descending to landing.

The operating status information acquisition unit 236 acquires the operating status information indicating the operating status (i.e., the operating status as determined by the operating status determination unit 235) of each of the plurality of the UAVs n to be monitored, for example, from the UAV management database 222. As described above, the operating status indicates "stopped", "standing by for flight", "operating for take-off", "operating for landing", or "flying". Moreover, the operating status of the UAV n operating for take-off may indicate the start of take-off, ascending, or hovering (for take-off). Moreover, the operating status of the UAV n operating for landing may indicate hovering (for landing), descending, or landing.

The display control unit 237 causes, based on first position information of the UAV base, the base object to be displayed on the two-dimensional map screen of the monitor terminal T, and causes, based on the second position information of UAV n, vehicle information indicating the UAV n to be displayed on the two-dimensional map screen. Here, "causing, based on first position information of the UAV base, the base object to be displayed on the two-dimensional map screen" means controlling to display the base object at a first coordinate position (x1, y1) corresponding to a position (latitude and longitude) indicated by the first position information of the UAV base. The first coordinate position (x1, y1) is a coordinate position on the two-dimensional map screen. For example, the first coordinate position (x1, y1) is a coordinate position with a center of the upper left corner pixel of the two-dimensional map screen as the origin (x0, y0). Incidentally, this display target is the UAV base where the first coordinate position (x1, y1) corresponding to the first position information of the UAV base falls within the two-dimensional map screen.

On the other hand, "causing, based on the second position information of UAV n, vehicle information indicating the UAV n to be displayed on the two-dimensional map screen" means controlling to display the vehicle information indicating the UAV n at a second coordinate position (x2, y2) corresponding to a position (latitude and longitude) indicated by the second position information of the UAV n, or at a third coordinate position (x3, y3) shifted (i.e., moved) from the second coordinate position (x2, y2). Incidentally, this display target is the UAV n in which the second coordinate position (x2, y2) corresponding to the second position information of the UAV n or the third coordinate position (x3, y3) shifted from the second coordinate position (x2, y2) falls within the two-dimensional map screen. For example, the display control unit 237 causes the base object of the UAV base to be displayed at the first coordinate position (x1, y1) corresponding to the first position information of the UAV base. Then, the display control unit 237 causes first vehicle information indicating the UAV n in (during) take-off operation or landing operation at the UAV base to be displayed at the third coordinate position (x3, y3) shifted from the second coordinate position (x2, y2) corresponding to the second position information of the UAV n so as not to overlap with the base object of the UAV base. That is, the third coordinate position (x3, y3) is different from the second coordinate position (x2, y2) corresponding to the second position information of the UAV n in take-off operation or landing operation. Incidentally, the degree of shifting (in other words, the amount of shift) may be calculated, for example, based on the display size (area) of the base object and the display size of the vehicle information indicating the UAV n.

Figure 5:
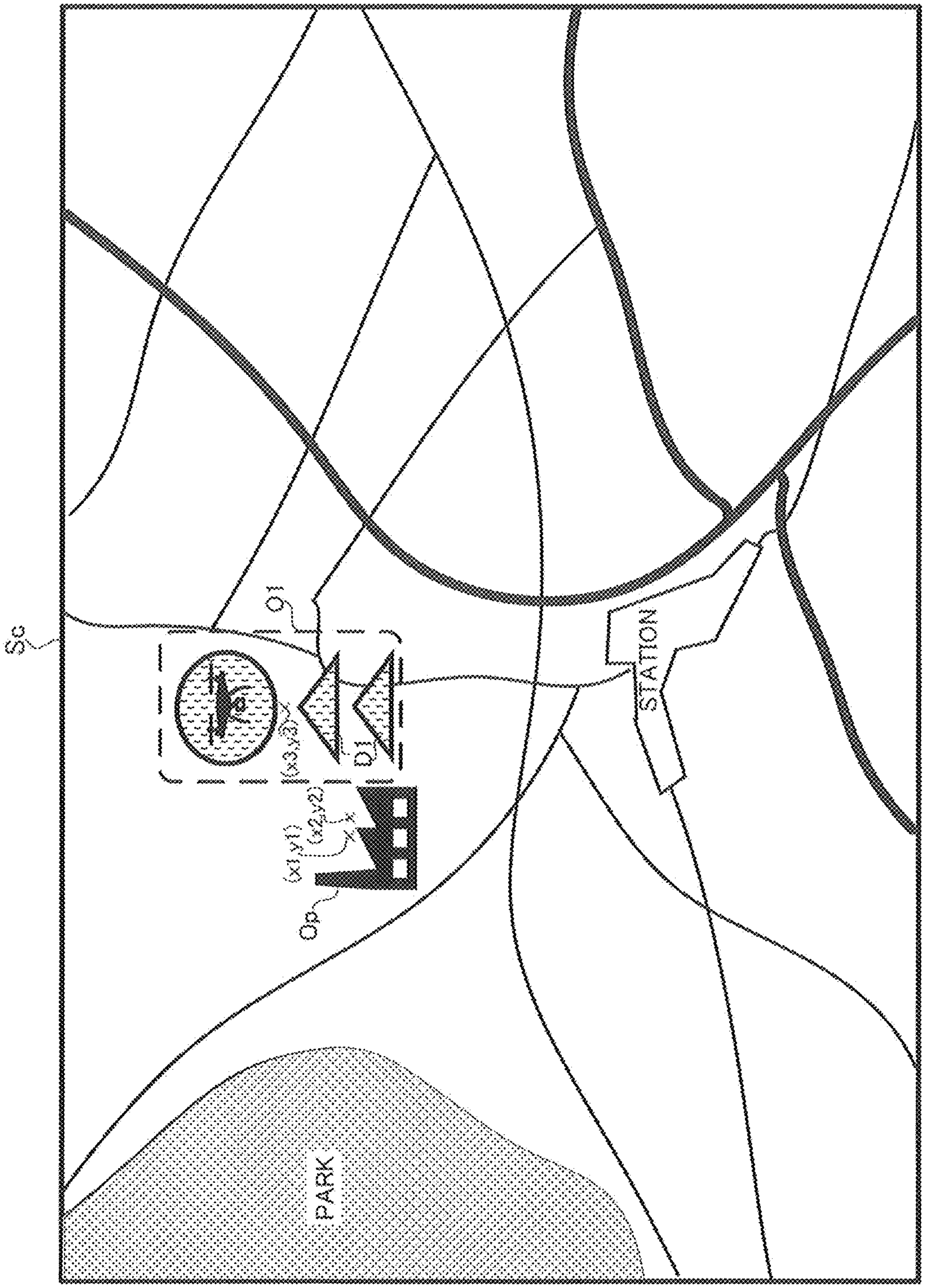
FIG. 5 is a diagram illustrating a display example of a two-dimensional map screen on which a base object of a UAV base and a UAV object of the UAV 1 in take-off operation are arranged.

Here, the first vehicle information indicating the UAV n in take-off operation or landing operation is, for example, an object (also referred to as an icon, hereinafter referred to as "UAV object") representing this UAV n, and is represented by a pattern (picture), a figure, a photograph or the like. FIG. 5 is a diagram illustrating a display example of the two-dimensional map screen on which the base object of the UAV base and the UAV object of the UAV 1 in take-off operation are arranged. In the example of FIG. 5, the UAV object O1 of the UAV 1 in take-off operation is displayed on the two-dimensional map screen Sc so as not to overlap with the base object Op of the UAV base. Incidentally, the UAV object O1 includes the figure D1 representing that it is in take-off operation. The figure D1 shown in FIG. 5 is an isosceles triangle, and the direction pointed by the apex (obtuse angle) of the triangle indicates the upward direction (i.e., ascending direction). Incidentally, the figure D1 is not limited to the triangle, but may be any figure (for example, an arrow figure) as long as a figure can point in a direction.

If the UAV object of the UAV n in take-off operation or landing operation at the UAV base is displayed at the second coordinate position (x2, y2) corresponding to the second position information of the UAV n, the UAV object overlaps with the base object of the UAV base, making it difficult for each object to be seen. Therefore, the visibility of the base object and the UAV object can be improved by displaying the UAV object at the third coordinate position (x3, y3) shifted from the second coordinate position (x2, y2) corresponding to the second position information of the UAV n in takeoff operation or landing operation at the UAV base. Incidentally, the coordinate position (x1, y1) corresponding to the first position information of the UAV base may be used as the coordinate position (x2, y2) corresponding to the second position information of the UAV n in take-off operation or landing operation at the UAV base.

Moreover, if there is a UAV n in flight outside the UAV base, the display control unit 237 causes the UAV object of the UAV n in flight to be displayed at a fourth coordinate position (x4, y4) corresponding to the second position information of the UAV n in flight. In this case, the display control unit 237 causes the UAV object of the UAV n in take-off operation or landing operation to be displayed at a fifth coordinate position (x5, y5) shifted from the coordinate position (x2, y2) corresponding to the second position information of the UAV n in take-off operation or landing operation so as not to overlap with the base object of the UAV base and the UAV object of the UAV n in flight. This makes it possible to improve the visibility of the UAV object of the UAV n in flight.

Figure 6:
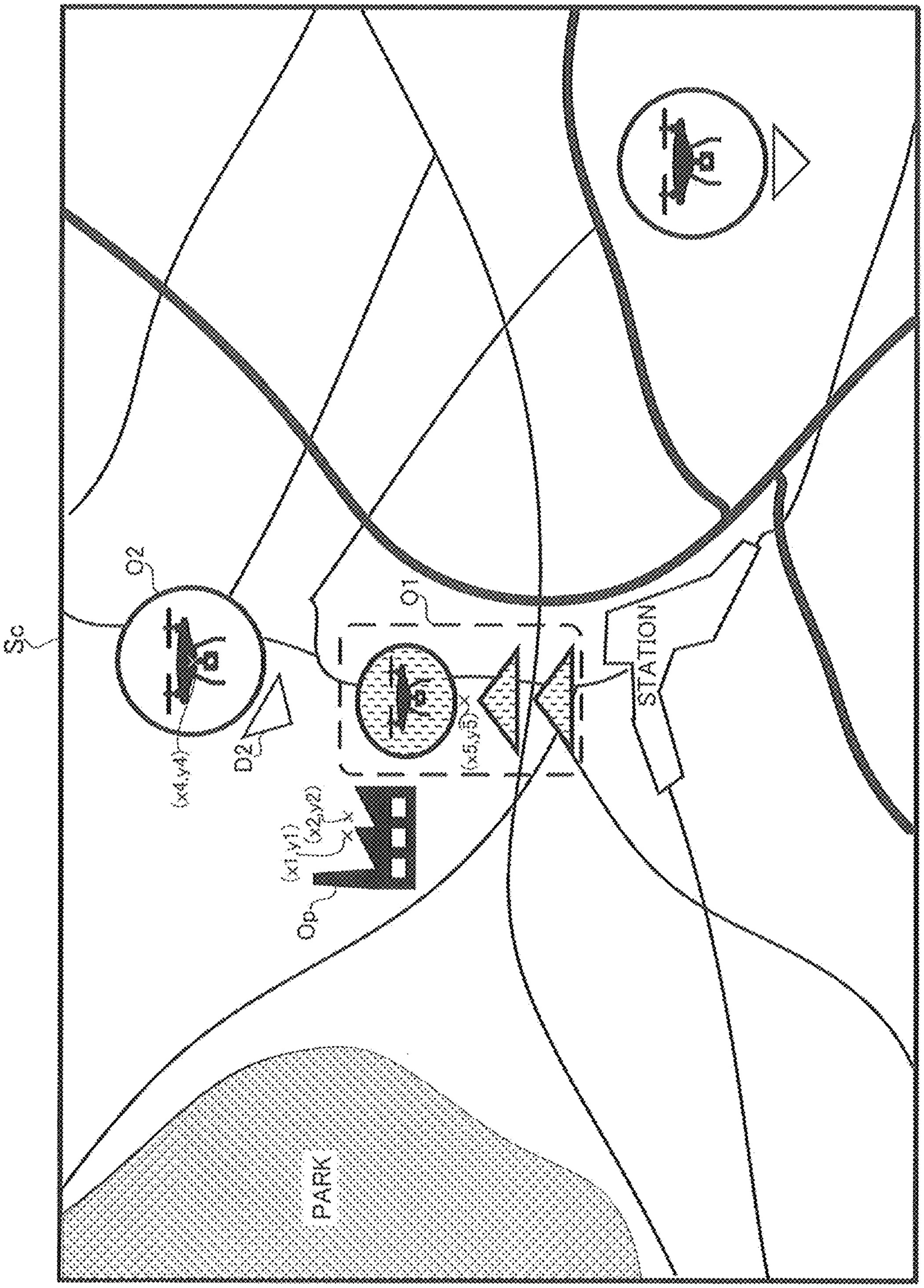
FIG. 6 is a diagram illustrating a display example of a two-dimensional map screen on which a base object of a UAV base, a UAV object of the UAV 1 in take-off operation, and a UAV object of the UAV 2 in flight are arranged.

FIG. 6 is a diagram illustrating a display example of a two-dimensional map screen on which the base object of the UAV base, the UAV object of the UAV 1 in take-off operation, and the UAV object of the UAV 2 in flight are arranged. In the example of FIG. 6, the UAV object O1 of the UAV 1 in take-off operation is displayed on the two-dimensional map screen Sc so as not to overlap with the base object Op of the UAV base and the UAV object O2 of the UAV 2 in flight. Namely, the UAV object O1 of the UAV 1 in take-off operation is displayed at the fifth coordinate position (x5, y5) shifted from the second coordinate position (x2, y2) corresponding to the second position information of the UAV 1 in take-off operation.

Incidentally, in the example of FIG. 6, the figure D2 representing the front direction is displayed in association with (added to) the UAV object O2 of the UAV 2 in flight. That is, based on the direction information (i.e., direction information of the UAV 2) acquired by the direction information acquisition unit 233, the display control unit 237 causes the figure representing the front direction of the UAV 2 to be displayed in association with the UAV object on the two-dimensional map screen. The figure D2 shown in FIG. 6 is an isosceles triangle, and the direction pointed by the apex (obtuse angle) of the triangle is the front direction. Incidentally, the figure D2 is not limited to the triangle, but may be any figure (for example, an arrow figure) as long as a figure can point in a direction.

Figure 7:
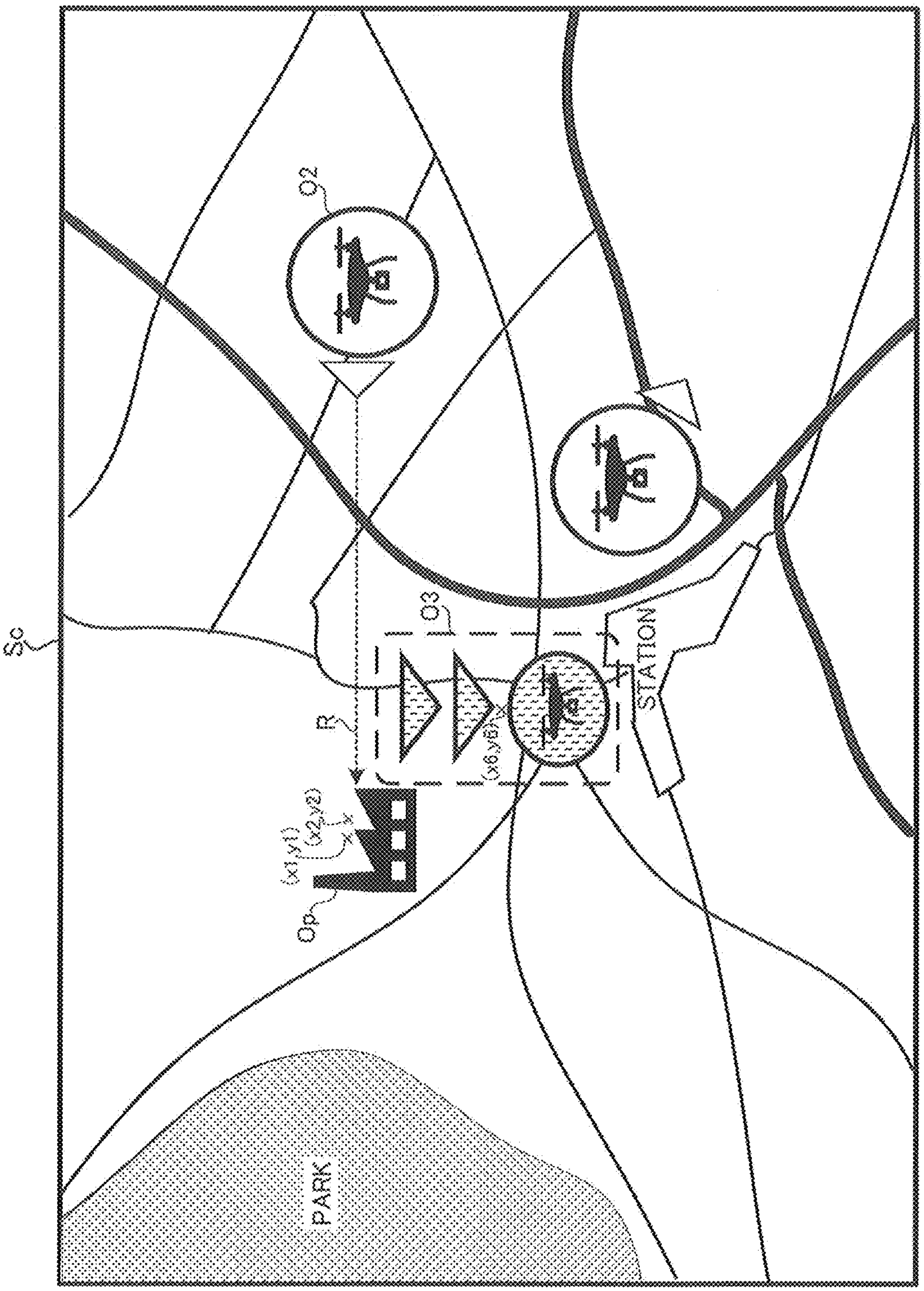
FIG. 7 is a diagram illustrating a display example of a two-dimensional map screen on which a base object of a UAV base, a UAV object of the UAV 3 in landing operation, and a UAV object of the UAV 2 in flight are arranged.

As another example, the display control unit 237 may cause the UAV object of the UAV n in take-off operation or landing operation at the UAV base to be displayed at a sixth coordinate position (x6, y6) shifted from the coordinate position (x2, y2) corresponding to the second position information of the UAV n in take-off operation or landing operation so as not to overlap with the base object of the UAV base and the flight path of the UAV n in flight. This makes it possible to improve the visibility of the flight path of the UAV n in flight. FIG. 7 is a diagram illustrating a display example of a two-dimensional map screen on which the base object of the UAV base, the UAV object of the UAV 3 in landing operation, and the UAV object of the UAV 2 in flight are arranged. In the example of FIG. 7, the UAV object O3 of the UAV 3 in landing operation is displayed on the two-dimensional map screen Sc so as not to overlap with the base object Op of the UAV base and the flight path R of the UAV object O2 of the UAV 2 in flight. Namely, the UAV object O2 of the UAV 3 in landing operation is displayed at the sixth coordinate position (x6, y6) shifted from the coordinate position (x2, y2) corresponding to the second position information of the UAV 3 in landing operation.

Moreover, the display control unit 237 may cause, based on the respective operating statuses of the UAVs n to be displayed, the first vehicle information (e.g., the UAV object) indicating the UAV n existing at the UAV base (i.e., the UAV n in flight standby, take-off operation, or landing operation at the UAV base) and the second vehicle information (e.g., the UAV object) indicating the UAV n in flight outside the UAV base to be displayed in different display modes on the two-dimensional map screen. This makes it possible for the monitor to easier grasp the operating status of the UAV n in flight and the UAV n at the UAV base on the two-dimensional map screen. Incidentally, the different display modes mean, for example, that the difference between the two (i.e., the first vehicle information and the second vehicle information) is recognizable by vision of the monitor. In other words, they are display modes that allow a person to visually recognize the difference. Moreover, "causing the first vehicle information and the second vehicle information to be displayed in different display modes" means, for example, controlling to display the UAV objects in such a manner that at least one of a pattern (picture), shape, size, color, and number of the UAV object is different. In the example of FIG. 6, the UAV object O1 of UAV 1 in take-off operation and UAV object O2 of UAV 2 in flight are different in the display color and the display size.

Moreover, it is preferable that the first vehicle information indicating the UAV n in flight standby at the UAV base may be the number of the UAV n in flight standby, not the UAV object. In this case, the number of UAVs n in flight standby at the UAV base is counted, and the counted number is displayed in association with the base object of the UAV base. This allows the monitor to grasp at a glance the number of UAVs n in flight standby at the UAV base on the two-dimensional map screen.

Figure 8:
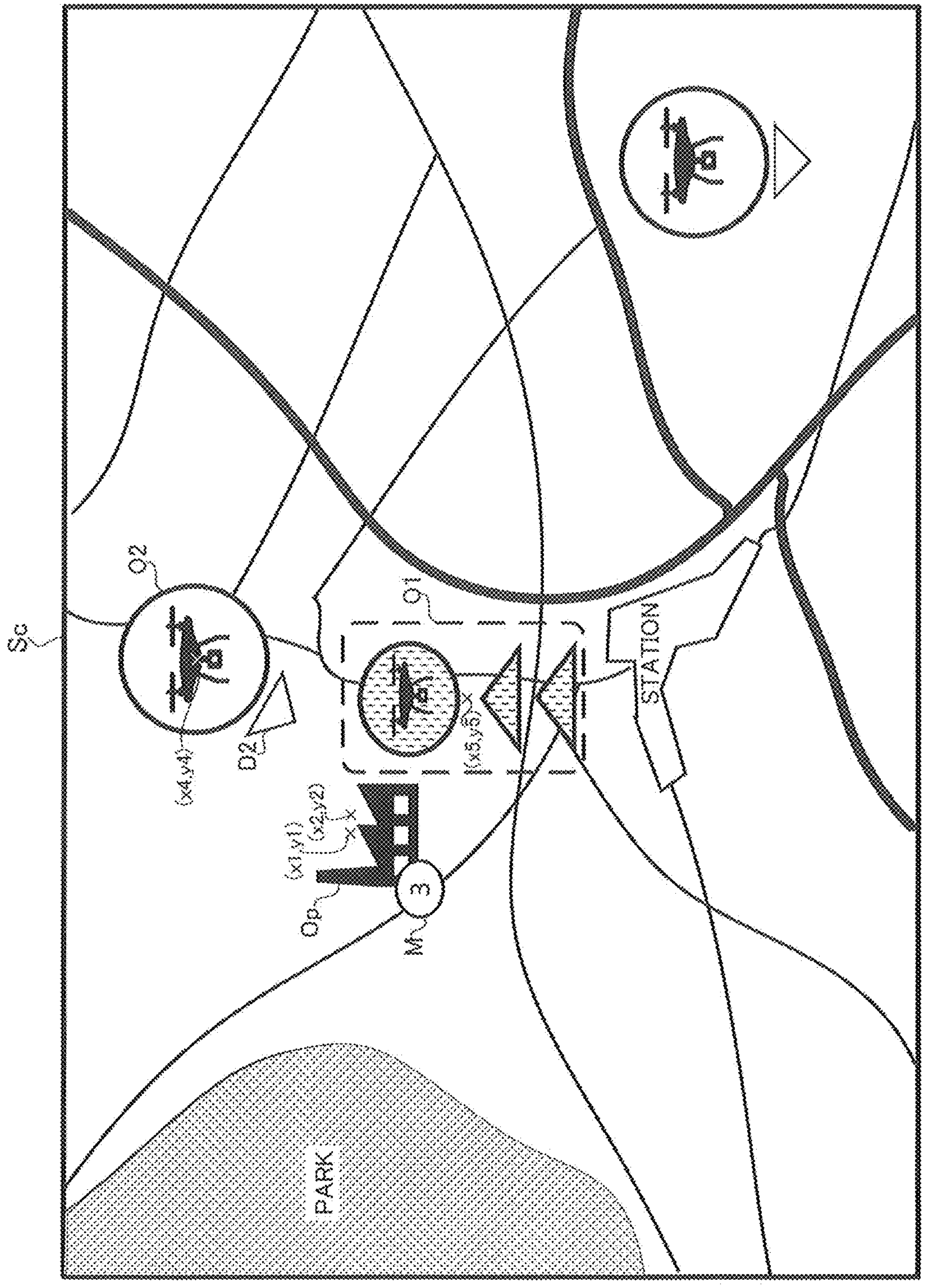
FIG. 8 is a diagram illustrating a display example of a two-dimensional map screen on which a base object of a UAV base, a UAV object of the UAV 1 in take-off operation, a UAV object of the UAV 2 in flight, and a mark M representing the number of UAV n in flight standby are arranged.

FIG. 8 is a diagram illustrating a display example of a two-dimensional map screen on which the base object of the UAV base, the UAV object of the UAV 1 in take-off operation, the UAV object of the UAV 2 in flight, and the mark M representing the number of UAV n in flight standby are arranged. In the example of FIG. 8, the mark M representing the number "3" of the UAV n in flight standby is added (partly superimposed) to the base object Op and displayed. This indicates that three UAVs n are in flight standby at the UAV base. Incidentally, if there is no UAV n in flight standby at the UAV base, the first vehicle information indicating the UAV n in flight standby may not be displayed, or "0" may be displayed as the number of UAV n.

Figure 9:
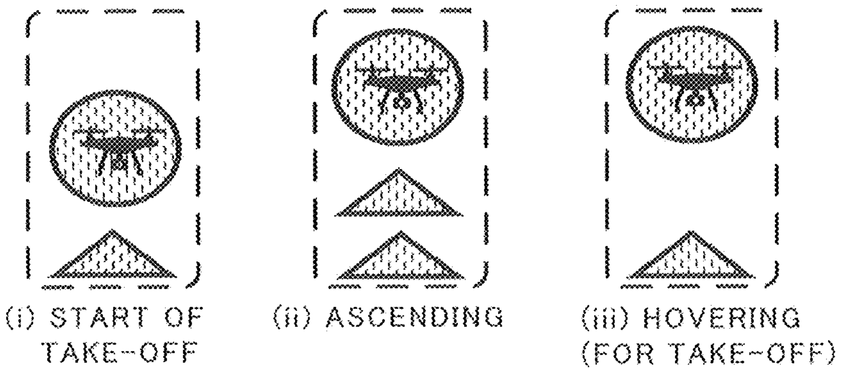
FIG. 9 is a diagram illustrating an example of UAV objects corresponding to each of (i) start of take-off, (ii) ascending, and (iii) hovering (for take-off).

Furthermore, the display control unit 237 may cause the UAV object of the UAV n in take-off operation at the UAV base to be displayed in different display modes between the start of take-off, the ascending, and the hovering (for take-off). FIG. 9 is a diagram illustrating an example of the UAV objects corresponding to each of (i) start of take-off, (ii) ascending, and (iii) hovering (for take-off). This can further improve the visibility of the UAV object and allows the monitor to easier grasp which stage the UAV n is in take-off operation at the UAV base. For example, the UAV object O1 shown in FIG. 6 is displayed as the UAV object corresponding to any of (i) start of take-off, (ii) ascending, and (iii) hovering (for take-off) shown in FIG. 9, according to the operating status classified in take-off operation.

Figure 10:
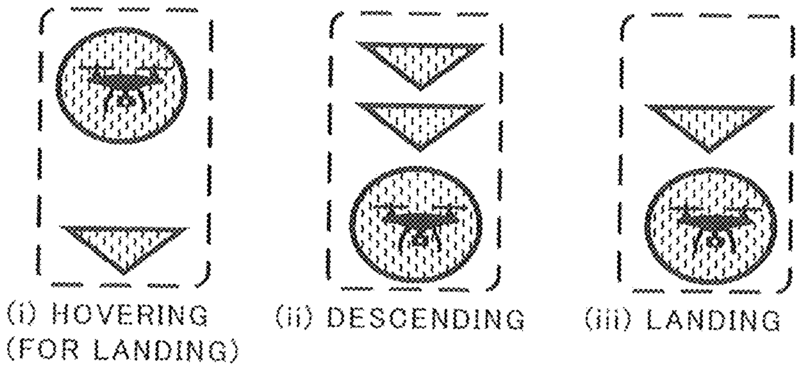
FIG. 10 is a diagram illustrating an example of UAV objects corresponding to each of (i) hovering (for landing), (ii) descending, and (iii) landing.

Moreover, the display control unit 237 may cause the UAV object of the UAV n in landing operation at the UAV base to be displayed in different display modes between hovering (for landing), descending, and landing. FIG. 10 is a diagram illustrating an example of the UAV objects corresponding to each of (i) hovering (for landing), (ii) descending, and (iii) landing. This can further improve the visibility of the UAV object and allows the monitor to easier grasp which stage the UAV n is in landing operation at the UAV base. For example, the UAV object O3 shown in FIG. 7 is displayed as the UAV object corresponding to any of (i) hovering (for landing), (ii) descending, and (iii) landing shown in FIG. 10, according to the operating status classified in landing operation.

Incidentally, the display control of the base object and the UAV object is performed by transmitting the display control data to the monitor terminal T through the communication unit 21 by the display control unit 237. The display control data is data for displaying the base object and the UAV object. The display control data includes, for example, image data of the base object, image data of UAV object, and data indicating the coordinate positions of these objects. Moreover, the data for display control data may include text data indicating the number of UAVs n in flight standby at the UAV base.

When an operation instruction is received to the UAV n through the operation screen displayed on the monitor terminal T (that is, when the operation instruction information indicating the operation instruction is received through the communication unit 21), the flight control unit 238 transmits control information according to the operation instruction to the UAV n subject to the operation instruction. The control information includes control information for taking off the UAV n at the UAV base or control information for landing the UAV n at the UAV base, as described above.

[1-3. Configuration and Function of Monitor Terminal T]

Figure 11:
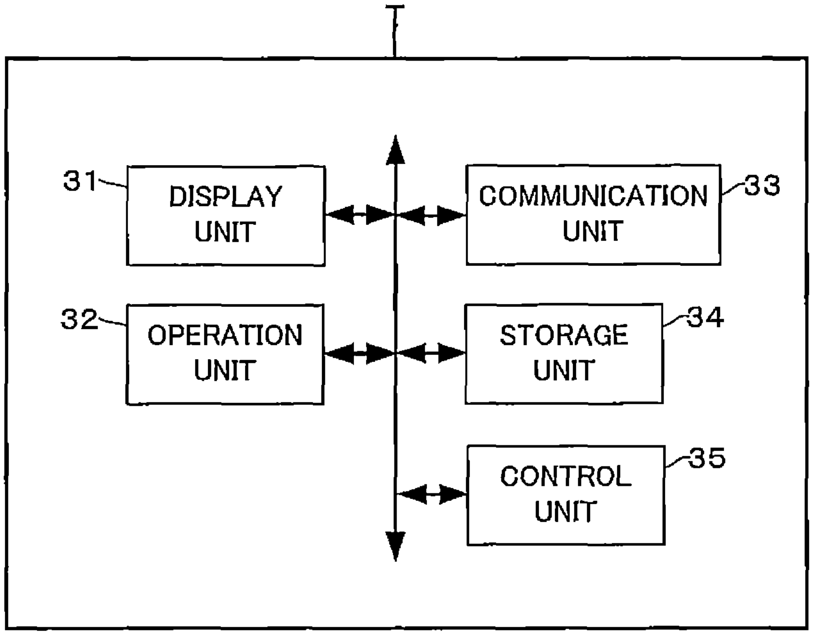
FIG. 11 is a diagram illustrating a schematic configuration example of the monitor terminal T.

Next, a configuration and a function of the monitor terminal T will be described with reference to FIG. 11. FIG. 11 is a diagram illustrating a schematic configuration example of the monitor terminal T. As illustrated in FIG. 11, the monitor terminal T includes a display unit 31, an operation unit 32, a communication unit 33, a storage unit 34, a control unit 35, and the like. The display section 31 includes the display for displaying the two-dimensional map screen and the operation screen, etc. The display may be physically divided into a display for the two-dimensional map screen and a display for the operation screen. Moreover, the display may be a touch panel capable of receiving an operation instruction by a user's finger, pen, or the like. The operation unit 32 includes a keyboard and a mouse operated by the monitor. The communication unit 33 includes a wireless communication function and controls communication performed via the communication network NW.

The storage unit 34 includes, for example, a hard disk drive (HDD) or a solid state drive (SSD), and stores various installed programs and data. The various programs include an operating system (OS), applications, and a web browser. The applications include a monitor application for monitoring UAVs n and a control application for controlling UAVs n. The monitor application may incorporate and manage the data constituting the two-dimensional map screen, image data of the base objects, image data of the UAV objects, and the like. Moreover, the control application may incorporate and manage the data constituting the operation screen.

The control unit 35 includes at least one CPU, an ROM, an RAM, and the like. The control unit 35 causes the two-dimensional map screen to be displayed on the display in accordance with the monitor application. The data constituting the two-dimensional map screen may be received from the UAV monitoring server SA as appropriate. The display range of the two-dimensional map image in the two-dimensional map screen is changed in response to an instruction from the operation unit 32. Then, the information indicating the display range of the two-dimensional map image may then be transmitted to the UAV monitoring server SA. Incidentally, the control unit 35 may receive a web page from the UAV monitoring server SA when an URL (Uniform Resource Locator) of the web page containing data constituting the two-dimensional map screen is specified by the web browser, and cause the two-dimensional map screen to be displayed on the display of the display unit 31. Then, when the display control data is received from the UAV monitoring server SA, the control unit 35 causes the base objects, the UAV objects and the like to be displayed on the two-dimensional map screen, for example, as shown in FIGS. 5 to 8.

Moreover, the control unit 35 causes the operation screen to be displayed on the display in accordance with the control application. The data constituting the operation screen may be received from the UAV monitoring server SA as appropriate. Incidentally, the control unit 35 may receive a web page from the UAV monitoring server SA when the URL of the web page including the data constituting the operation screen is specified by the web browser, and cause the operation screen to be displayed on the display of the display unit 31. Then, when an operation instruction pertaining to the flight control of the UAV n is received from the monitor via the operation unit 32 in the display state of the operation screen, control information according to the operation instruction is transmitted to the UAV monitoring server SA.

[2. Operation of UAV Monitoring System S]

Figure 12:
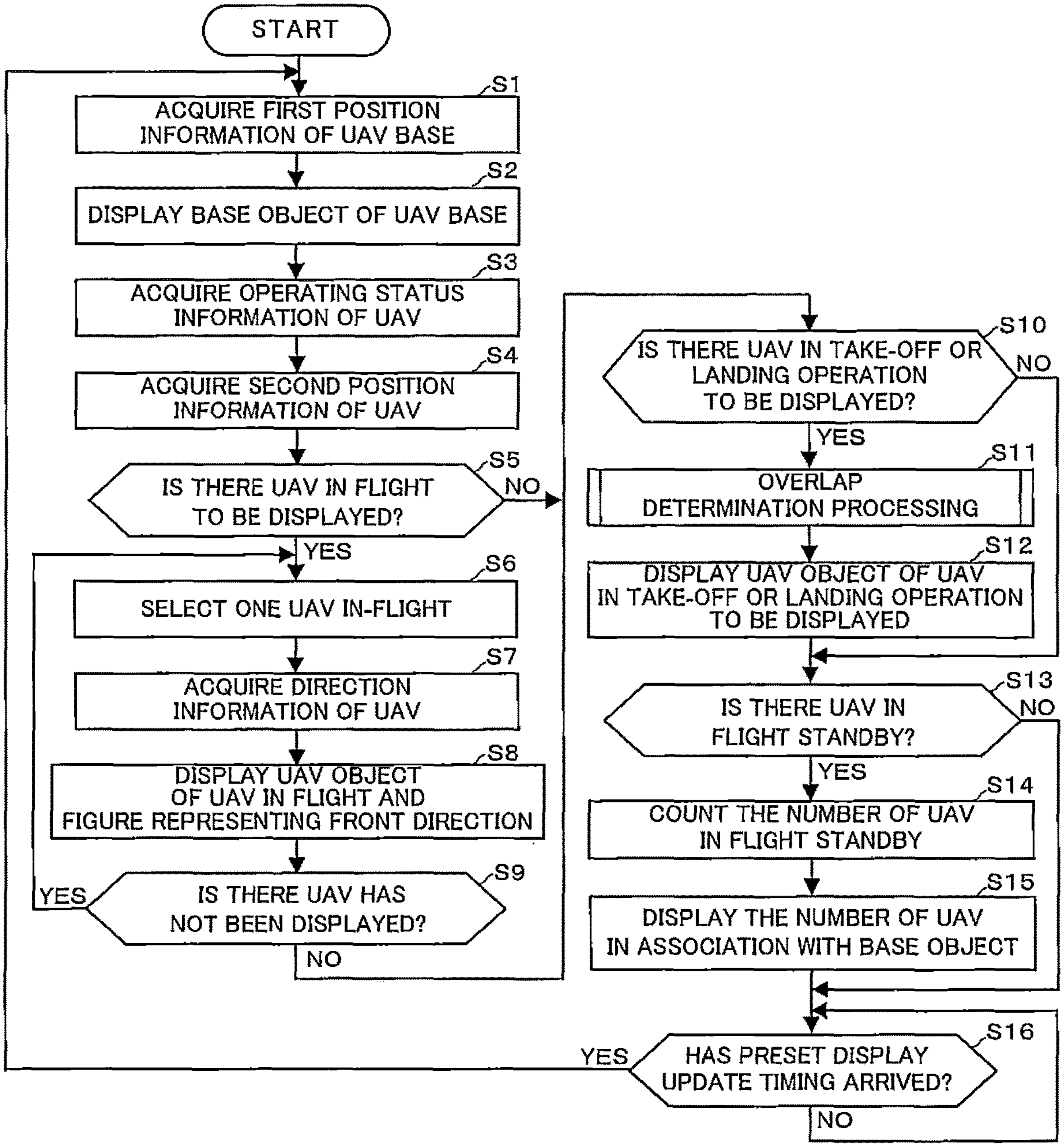
FIG. 12 is a flowchart illustrating an example of display control processing of the control unit 23 in the UAV monitoring server SA.
Figure 13:
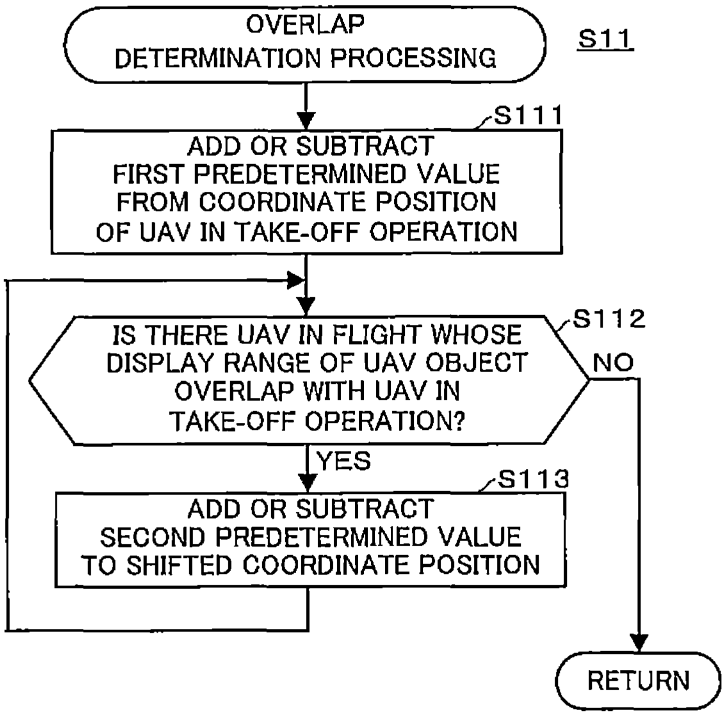
FIG. 13 is a flowchart illustrating an example of overlap determination processing in step S11 shown in FIG. 12.

Next, an operation of the UAV monitoring system S will be described with reference to FIGS. 12 to 13. FIG. 12 is a flowchart illustrating an example of display control processing of the control unit 23 in the UAV monitoring server SA. FIG. 13 is a flowchart illustrating an example of overlap determination processing in step S11 shown in FIG. 12. Incidentally, in parallel with the processing illustrated in FIG. 12, as described above, a process for determining the operating status of the UAV n to be monitored, is performed by the operating status determination unit 235. The operating status thus determined is stored in the UAV management database 222 and used in the processing illustrated in FIG. 12. Moreover, as a premise for the processing illustrated in FIG. 12, it is assumed that the monitor terminal T activates the monitor application and displays the two-dimensional map screen on the display for the two-dimensional map screen. Moreover, the processing illustrated in FIG. 12 will be taken as an example for convenience of explanation when the coordinate position corresponding to the first position information of one UAV base is within the two-dimensional map screen.

When the processing illustrated in FIG. 12 is started, the control unit 23 acquires, by the first position information acquisition unit 231, the first position information indicating the position of the UAV base to be displayed (step S1). Next, the control unit 23 causes the base object of the UAV base to be displayed at the coordinate position (x1, y1) corresponding to the first position information acquired in step S1 (step S2). For example, as described above, the display control unit 237 transmits the display control data for displaying the base object to the monitor terminal T. As a result, the base object is displayed at the coordinate position (x1, y1) corresponding to the first position information of the UAV base on the two-dimensional map screen.

Next, the control unit 23 acquires, by the operating status information acquisition unit 236, the operating status information indicating the operating status of each UAV n to be monitored (step S3). Next, the control unit 23 acquires, by the second position information acquisition unit 232, the second position information indicating the position of each UAV n (excluding the UAV n whose the operating status is stopped) to be monitored (step S4).

Next, the control unit 23 determines whether there is the UAV n in flight to be displayed among the plurality of UAVs n to be monitored on the basis of the operating status indicated by the operating status information acquired in step S3 (step S5). Here, the UAV n in flight to be displayed is the UAV n whose coordinate position corresponding to the second position information acquired in step S4 falls within the two-dimensional map screen. When it is determined that there is the UAV n in flight to be displayed (step S5: YES), the processing proceeds to step S6. On the other hand, when it is determined that there is no the UAV n in-flight to be displayed (step S5: NO), the processing proceeds to step S10.

In step S6, the control unit 23 selects one UAV n in-flight to be displayed (for example, selects the vehicle ID). Next, the control unit 23 acquires, by the direction information acquisition unit 233, the direction information indicating the front direction of the UAV n selected in step S6 (step S7). Next, the control unit 23 causes the UAV object of the UAV n to be displayed at the coordinate position (x4, y4) corresponding to the second position information acquired in step S4, and also causes the figure representing the front direction indicated by the direction information acquired in step S7 to be displayed in association with the UAV object (step S8). For example, as described above, the display control unit 237 transmits the display control data for displaying the UAV object of the UAV n in flight and the figure representing the front direction to the monitor terminal T. As a result, the UAV object and the figure of the UAV n are displayed at the coordinate position (x4, y4) corresponding to the second position information of the UAV n in flight on the two-dimensional map screen. Incidentally, the display control data includes the vehicle ID of the UAV n corresponding to the UAV object.

Next, the control unit 23 determines whether there is the UAV n whose the UAV object has not yet been displayed among the UAVs n in flight to be displayed (step S9). When it is determined that there is the UAV n whose the UAV object has not yet been displayed (step S9: YES), the processing returns to step S6, and the same processing as described above is performed. On the other hand, when it is determined that there is no UAV n whose the UAV object has not yet been displayed (step S9: NO), the processing proceeds to step S10.

In step S10, the control unit 23 determines whether there is the UAV n in take-off operation or landing operation to be displayed among the plurality of UAVs n to be monitored on the basis of the operating status indicated by the operating status information acquired in step S3. Here, the UAV n in take-off operation or landing operation to be displayed is the UAV n in take-off operation or landing operation at the UAV base to be displayed. When it is determined that there is the UAV n in take-off operation or landing operation to be displayed (step S10: YES), the processing proceeds to step S11. On the other hand, when it is determined that there is no the UAV n in take-off operation or landing operation to be displayed (step S10: NO), the processing proceeds to step S13.

In step S11, the control unit 23 performs the overlap determination processing by the display control unit 237. The overlap determination processing described below is applied to the UAV n in take-off operation, but it can be similarly applied to the UAV n in landing operation. In the overlap determination processing illustrated in FIG. 13, the display control unit 237 adds or subtracts a first predetermined value from the coordinate position (x2, y2) corresponding to the second position information of the UAV n in take-off operation such that the UAV object of the UAV n in take-off operation does not overlap with the base object displayed in step S2 (step S111). As a result, the coordinate position (x2, y2) corresponding to the second position information of the UAV n in take-off operation is shifted to the coordinate position (x3, y3).

Next, the display control unit 237 determines whether there is the UAV n in flight whose a display range of the UAV object overlaps with the UAV n in take-off operation whose the coordinate position was shifted in step S111 (step S112). Here, "the display range of the UAV objects overlaps" means, for example, at least a portion of the display range based on the coordinate position (x3, y3) of the UAV object of the UAV 1 in take-off operation and the display range based on the coordinate position (x4, y4) of the UAV object of the UAV 2 in flight overlap. The display range may be set in advance according to, for example, the display size of the UAV object. Incidentally, an upper limit value of the number of processing times of step S112 may be defined. In this case, when the number of the processing times reaches the upper limit value, instead of causing the UAV object of the UAV n in take-off operation to be displayed on the two-dimensional map screen, a small mark indicating that the UAV n is in take-off operation may be displayed.

Figure 14:
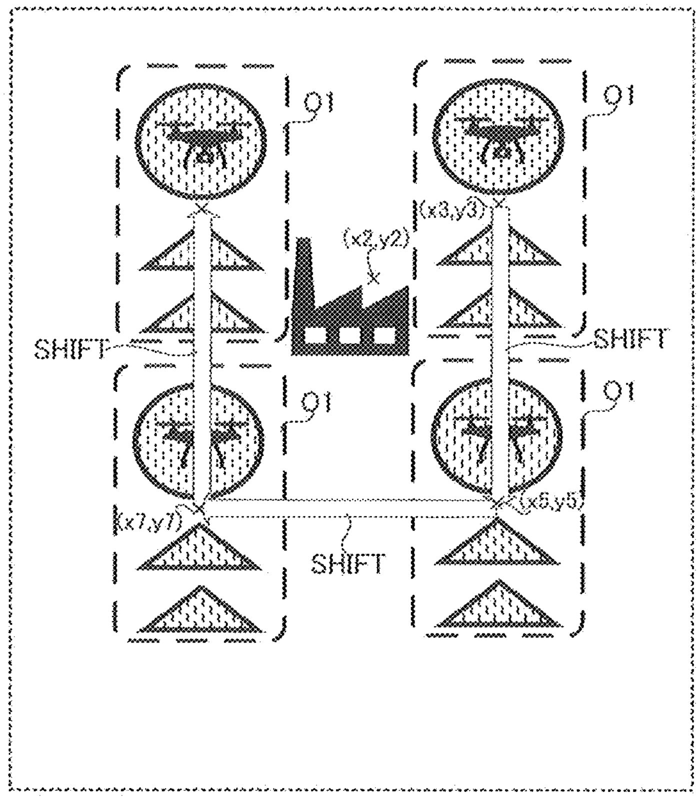
FIG. 14 is a conceptual diagram Illustrating a state a state in which a coordinate position is repeatedly shifted by a second predetermined value.

When it is determined that there is the UAV n in-flight in which the display range of the UAV object overlaps (step S112: YES), the processing proceeds to step S113. In step S113, the display control unit 237 adds or subtracts a second predetermined value to the coordinate position (x3, y3) shifted in step S111. As a result, the coordinate position (x3, y3) corresponding to the second position information of the UAV n in take-off operation is shifted to the coordinate position (x5, y5). Thereafter, the processing returns to step S112, and the coordinate position is repeatedly shifted by the second predetermined value (that is, the same distance) until it is determined that there is no UAV n in flight with which the display range of the UAV object overlaps. FIG. 14 is a conceptual diagram Illustrating a state a state in which the coordinate position is repeatedly shifted by the second predetermined value. In the example of FIG. 14, the coordinate position is shifted by the second predetermined value from the coordinate position (x3, y3) in the downward direction, then shifted by the second predetermined value from the coordinate position (x5, y5) in the left direction, and finally shifted by the second predetermined value from the coordinate position (x7, y7) in the upward direction. In this way, by changing the direction every time the coordinate position is shifted by the second predetermined value, the processing load of the CPU can be reduced compared to processing of searching for a free space for displaying the UAV object of the UAV n in take-off operation on the two-dimensional map screen.

On the other hand, when it is determined that there is no UAV n in-flight in which the display range of the UAV object overlaps (step S112: NO), it returns to the processing illustrated in FIG. 12. Incidentally, it is conceivable that the plurality of UAVs n may be taking off or landing simultaneously (e.g., when both UAVs n are in take-off operation, both UAVs n are in landing operation, or one UAV n is in take-off operation and the other UAV n is in landing operation) at one UAV base (e.g., a UAV base such as a hub airport). In this case, the display control unit 237 may cause a mark representing the number of UAVs n in take-off operation to be displayed in addition to the UAV object of the UAVs n in take-off operation. Moreover, the display control unit 237 may cause a mark representing the number of UAVs n in landing operation to be displayed in addition to the UAV object of the UAVs n in landing operation. Alternatively, the display control unit 237 may cause a mark representing the sum of the number of UAVs n in take-off operation and the number of UAVs n in landing operation to be displayed in association with the base object of the UAV base.

Returning to FIG. 12, the control unit 23 causes the UAV object of the UAV n in take-off operation or landing operation to be displayed at the coordinate position (e.g., the shifted coordinate position (x5, y5)) finally determined in the overlap determination processing of step S11 in a different display mode than the UAV object of the UAV n in flight (step S12). For example, as described above, the display control unit 237 transmits display control data for displaying the UAV object of the UAV n in take-off operation or landing operation to the monitor terminal T. As a result, the UAV object of the UAV n is displayed at the coordinate position finally determined for the UAV n in take-off operation or landing operation on the two-dimensional map screen. Incidentally, the display control data includes the vehicle ID of the UAV n corresponding to the UAV object. After the UAV object is displayed in step S12, the processing proceeds to step S13.

Here, it is preferable that the UAV object displayed in step S12 is the UAV object corresponding to any one of (i) start of take-off, (ii) ascending, and (iii) hovering (for take-off) shown in FIG. 9, according to the operating status indicated by the operating status information acquired in step S3. Alternatively, the UAV object displayed in step S12 may be the UAV object corresponding to any one of (i) hovering (for landing), (ii) descending, and (iii) landing shown in FIG. 10, according to the operating status indicated by the operating status information acquired in step S3.

In step S13, the control unit 23 determines whether there is the UAV n in flight standby among the plurality of UAVs n to be monitored on the basis of the operating status indicated by the operating status information acquired in step S3. Here, the UAV n in flight standby to be displayed is the UAV n in flight standby at the UAV base to be displayed. When it is determined that there is the UAV n in flight standby to be displayed (step S13: YES), the processing proceeds to step S14. On the other hand, when it is determined that there is no the UAV n in flight standby to be displayed (step S13: NO), the processing proceeds to step S16.

In step S14, the control unit 23 counts (accumulates) the number of the UAV n in flight standby at the UAV base. Next, the control unit 23 causes the number of the UAV n counted in step S14 to be displayed in association with the base object of the UAV base (step S15). For example, the display control unit 237 transmits the display control data for displaying the counted number of the UAV n to the monitor terminal T. As a result, the number of the UAV n is displayed in association with the base object of the UAV base on the two-dimensional map screen. After the number of the UAV n is displayed in step S15, the processing proceeds to step S16.

In step S16, the control unit 23 determines whether a preset display update timing has arrived. Here, the display update timing is set, for example, to arrive at predetermined time intervals (e.g., 0.01 seconds to 1 second). When it is determined that the preset display update timing has arrived (step S16: YES), the processing returns to step S1. As a result, the display of the base object and the UAV object, etc. is updated.

As described above, according to the embodiment, the UAV monitoring server SA causes the base object of the UAV base to be displayed on the two-dimensional map screen, and also causes, based on the operation status of each of the plurality of UAVs n, the information indicating the UAV n in flight standby, take-off operation, or landing operation at the UAV base and the information indicating the UAV n in flight outside the UAV base to be displayed in a different display mode on the two-dimensional map screen. Therefore, it is possible for the monitor to easier grasp the operating statuses of the UAV n in flight and the UAV n existing at the UAV base on the two-dimensional map screen. That is, according to the above embodiment, for example, even if the plurality of UAVs n simultaneously exist at the UAV base, the information indicating the UAV n existing at the UAV base can be displayed in a distinguishable manner with the information indicating the UAV n in flight. Therefore, it is possible to prevent making it difficult for the monitor to grasp the operating status of each UAV n.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above embodiment, the UAV monitoring server SA has been described as an example of the information processing device of the present invention, but the monitor terminal T may also be the information processing device. In this case, the control unit 35 of the monitor terminal T functions in the same way as the first position information acquisition unit 231, the second position information acquisition unit 232, the direction information acquisition unit 233, the speed information acquisition unit 234, the operating status determination unit 235, and the display control unit 237 described above, while communicating with the UAV monitoring server SA via communication network NW. For example, the control unit 35 of the monitor terminal T obtains, from the UAV monitoring server SA, acquires the first position information of the UAV base, the second position information of each of the plurality of UAVs n, and the operating status information of each of the plurality of UAVs n. Then, the control unit 35 of the monitor terminal T causes, based on first position information of the UAV base, the base object to be displayed on the two-dimensional map screen, and causes, based on the operating status of each of the plurality of UAVs n, the first vehicle information indicating the UAV n in flight standby, take-off operation, or landing operation at the UAV base) and the second vehicle information indicating the UAV n in flight outside the UAV base to be displayed in different display modes on the two-dimensional map screen. For example, the control unit 35 of the monitor terminal T may cause the number of the UAV n in flight standby, as the first vehicle information indicating the UAV n in flight standby, to be displayed in association with the base object of the UAV base.

Moreover, the control unit 35 of the monitor terminal T may cause the base object of the UAV base to be displayed at the coordinate position corresponding to the first position information of the UAV base, and cause the first vehicle information indicating the UAV n in take-off operation or landing operation at the UAV base to be displayed at the coordinate position shifted from the coordinate position corresponding to the second position information of the UAV n in take-off operation or landing operation, so as not to overlap with the base object of the UAV base. Furthermore, the control unit 35 of the monitor terminal T may cause the second vehicle information of the UAV n in flight to be displayed at the coordinate position corresponding to the second position information of the UAV n in flight, and determine whether there is the UAV n in flight in which the information display range overlaps with the UAV n in take-off operation or landing operation before the first vehicle information indicating the UAV n in take-off operation or landing operation is displayed at the shifted coordinate position. Then, when it is determined that there is the UAV n in flight, the control unit 35 of the monitor terminal T may cause the first vehicle information indicating the UAV n in take-off operation or landing operation to be displayed at the coordinate position further shifted from the shifted coordinate position. Incidentally, in the above embodiment, the UAV has been described as an example of the unmanned aerial vehicle, but the present invention is also applicable to a flying robot and the like.

NOTE

[1] An information processing device according to the present disclosure includes: a first acquisition unit configured to acquire first position information indicating a position of a base used for take-off or landing of an unmanned aerial vehicle; a second acquisition unit configured to acquire second position information indicating a position of each of a plurality of unmanned aerial vehicles; a third acquisition unit configured to acquire operating status information indicating an operating status of each of the plurality of unmanned aerial vehicle; and a display control unit configured to cause an object representing the base to be displayed on a two-dimensional map screen on the basis of the first position information, and to cause information indicating each of the plurality of unmanned aerial vehicles to be displayed on the two-dimensional map screen on the basis of the second position information. The display control unit may be configured to further cause, based on the operating status information of each of the plurality of unmanned aerial vehicle, first vehicle information and second vehicle information to be displayed in different display modes, the first vehicle information indicating the unmanned aerial vehicle in flight standby, take-off operation, or landing operation at the base, and the second vehicle information indicating the unmanned aerial vehicle in flight outside the base. This makes it possible for a monitor to easier grasp the operating statuses of the unmanned aerial vehicle n in flight and the unmanned aerial vehicle existing at the base on the two-dimensional map screen.

[2] In the information processing device described in [1] above, the display control unit may be configured to further cause an object representing the base to be displayed at a first coordinate position corresponding to the first position information on the two-dimensional map screen, and cause the first vehicle information indicating the unmanned aerial vehicle in take-off operation or landing operation to be displayed at a third coordinate position on the two-dimensional map screen so as not to overlap the object representing the base, the third coordinate position being a coordinate position different from a second coordinate position corresponding to the second position information of the unmanned aerial vehicle in take-off operation or landing operation. This makes it possible to improve the visibility of the object representing the base and the first vehicle information indicating the unmanned aerial vehicle in take-off operation or landing operation.

[3] In the information processing device described in [2] above, the display control unit may be configured to further cause the second vehicle information to be displayed at a fourth coordinate position corresponding to the second position information of the unmanned aerial vehicle in flight on the two-dimensional map screen, determine whether there is the unmanned aerial vehicle in flight in which an information display range overlaps with the unmanned aerial vehicle in take-off operation or landing operation before the first vehicle information indicating the unmanned aerial vehicle in take-off operation or landing operation is displayed at the third coordinate position. In a case where it is determined that there is the unmanned aerial vehicle in flight with the unmanned aerial vehicle in take-off operation or landing operation, the display control unit may be configured to cause the first vehicle information indicating the unmanned aerial vehicle in take-off operation or landing operation to be displayed at a fifth coordinate position on the two-dimensional map screen, the fifth coordinate position being a coordinate position different from the second coordinate position and the third coordinate position. This makes it possible to improve the visibility of the second vehicle information indicating the unmanned aerial vehicle in flight.

[4] In the information processing device described in any one of [1] to [3] above, the display control unit may be configured to further cause an object representing the base to be displayed at a first coordinate position corresponding to the first position information on the two-dimensional map screen, cause the second vehicle information to be displayed at a fourth coordinate position corresponding to the second position information of the unmanned aerial vehicle in flight on the two-dimensional map screen, and cause first vehicle information indicating the unmanned aerial vehicle in take-off operation or landing operation to be displayed at a third coordinate position on the two-dimensional map screen so as not to overlap the object representing the base and the second vehicle information, the third coordinate position being a coordinate position different from a second coordinate position corresponding to the second position information of the unmanned aerial vehicle in take-off operation or landing operation. This makes it possible to improve the visibility of the second vehicle information indicating the unmanned aerial vehicle in flight.

[5] In the information processing device described in any one of [1] to [4] above, the display control unit may be configured to further cause an object representing the base to be displayed at a first coordinate position corresponding to the first position information on the two-dimensional map screen, cause the second vehicle information to be displayed at a fourth coordinate position corresponding to the second position information of the unmanned aerial vehicle in flight on the two-dimensional map screen, and cause first vehicle information indicating the unmanned aerial vehicle in take-off operation or landing operation to be displayed at a sixth coordinate position on the two-dimensional map screen so as not to overlap the object representing the base and a flight path of the unmanned aerial vehicle in flight, the sixth coordinate position being a coordinate position different from a second coordinate position corresponding to the second position information of the unmanned aerial vehicle in take-off operation or landing operation. This makes it possible to improve the visibility of the flight path of the unmanned aerial vehicle in flight.

[6] In the information processing device described in any one of [1] to [5] above, the take-off operation may be classified into at least a start of take-off, ascending, and hovering for take-off; and the display control unit may be configured to further cause the first vehicle information indicating the unmanned aerial vehicle in take-off operation to be displayed in different display modes between the start of take-off, the ascending, and the hovering for take-off. This allows the monitor to easier grasp which stage the unmanned aerial vehicle is in take-off operation at the base.

[7] In the information processing device described in any one of [1] to [6] above, the landing operation may be classified into at least hovering for landing, descending, and landing; and the display control unit may be configured to further cause the first vehicle information indicating the unmanned aerial vehicle in landing operation to be displayed in different display modes between the hovering for landing, the descending, and the landing. This allows the monitor to easier grasp which stage the unmanned aerial vehicle is in landing operation at the base.

[8] In the information processing device described in any one of [1] to [7] above, the display control unit may be configured to further cause the number of the unmanned aerial vehicle as information indicating the unmanned aerial vehicle in flight standby to be displayed in association with the object representing the base. This allows the monitor to grasp at a glance the number of the unmanned aerial vehicle in flight standby at the base on the two-dimensional map screen.

[9] A display control method according to the present disclosure includes: acquiring first position information indicating a position of a base used for take-off or landing of an unmanned aerial vehicle; acquiring second position information indicating a position of each of a plurality of unmanned aerial vehicles; acquiring operating status information indicating an operating status of each of the plurality of unmanned aerial vehicle; displaying an object representing the base on a two-dimensional map screen on the basis of the first position information; and displaying, based on the second position information and the operating status information of each of the plurality of unmanned aerial vehicle, first vehicle information and second vehicle information in different display modes, the first vehicle information indicating the unmanned aerial vehicle in flight standby, in take-off operation, or landing operation at the base, and the second vehicle information indicating the unmanned aerial vehicle in flight outside the base.

REFERENCE SIGNS LIST

1, 2 UAV
11 Drive unit
12 Positioning unit
13 Communication unit
14 Sensor unit
15 Storage unit
16 Control unit
21 Communication unit
22 Storage unit
23 Control unit
31 Display unit
32 Operation unit
33 Communication unit
34 Storage unit
35 Control unit
231 First position information acquisition unit
232 Second position information acquisition unit
233 Direction information acquisition unit
234 Speed information acquisition unit
235 Operating status determination unit
236 Operating status information acquisition unit
237 Display control unit
238 Flight control unit
SA UAV monitoring server
T Monitor terminal
S UAV monitoring system

What is claimed is:

1. An information processing device comprising:

at least one memory configured to store program code; and at least one processor configured to access the program code and operate as instructed by the program code, the program code including:

first acquisition code configured to cause the at least one processor to acquire first position information indicating a position of a base used for a take-off operation or a landing operation of an unmanned aerial vehicle of a plurality of unmanned aerial vehicles;

second acquisition code configured to cause the at least one processor to acquire second position information indicating a position of each of a plurality of unmanned aerial vehicles;

third acquisition code configured to cause the at least one processor to acquire operating status information indicating an operating status of each of the plurality of unmanned aerial vehicles;

control code configured to cause the at least one processor to determine whether there is at least one unmanned aerial vehicle in flight outside the base among the plurality of unmanned aerial vehicles to be displayed; and display control code configured to cause the at least one processor to:

cause an object representing the base to be displayed at a first coordinate position corresponding to the first position information on a two-dimensional map screen, in a case where it is determined that there is no unmanned aerial vehicle in flight outside the base is to be displayed:

cause first vehicle information to be displayed at a third coordinate position on the two-dimensional map screen so as not to overlap the object displayed at the first coordinate position, the third coordinate position being different from a second coordinate position corresponding to the second position information indicating a position of at least one unmanned aerial vehicle in the take-off operation or the landing operation among the plurality of unmanned aerial vehicles, and in a case where it is determined that there is at least one unmanned aerial vehicle in flight outside the base to be displayed:

cause second vehicle information to be displayed at a fourth coordinate position on the two-dimensional map screen, the fourth coordinate position corresponding to the second position information of an unmanned aerial vehicle in flight outside of the base of the plurality of unmanned aerial vehicles on the two-dimensional map screen, the fourth coordinate position being different than the first coordinate position and the third coordinate position, determine whether there is an information display range overlap between the unmanned aerial vehicle in flight outside the base and the unmanned aerial vehicle in take-off operation or landing operation, and in a case where it is determined that there is an information display range overlap, cause the first vehicle information to be displayed at a fifth coordinate position on the two-dimensional map screen so as not to overlap the object representing the base and the second vehicle information, the fifth coordinate position being different from the first coordinate position, the second coordinate position, the third coordinate position, and the fourth coordinate position, wherein:

the first vehicle information and the second vehicle information are displayed in different display modes, the first vehicle information indicates the unmanned aerial vehicle in the take-off operation or the landing operation at the base, and the second vehicle information indicates the unmanned aerial vehicle in flight outside the base.

2. An information processing device according to claim 1, wherein the display control code is configured to cause cause the at least one processor to, in the case where it is determined that there is at least one unmanned aerial vehicle in flight outside the base to be displayed, cause first vehicle information to be displayed at a sixth coordinate position on the two-dimensional map screen so as not to overlap the object representing the base and a flight path of the at least one unmanned aerial vehicle in flight outside the base, the sixth coordinate position being a coordinate position different from the second coordinate position.

3. An information processing device according to claim 1, wherein the take-off operation is classified into at least a start of take-off, ascending, and hovering for take-off; and the display control code is configured to cause the at least one processor to further cause the first vehicle information indicating the unmanned aerial vehicle in the take-off operation to be displayed in different display modes for the start of take-off, the ascending, and the hovering for take-off.

4. An information processing device according to claim 1, wherein the landing operation is classified into at least hovering for landing, descending, and landing; and the display control code is configured to cause the at least one processor to further cause the first vehicle information indicating the unmanned aerial vehicle in the landing operation to be displayed in different display modes for the hovering for landing, the descending, and the landing.

5. An information processing device according to claim 1, wherein the display control code is configured to cause the at least one processor to further cause a number of unmanned aerial vehicles in flight standby of the plurality of the unmanned aerial vehicles to be displayed in association with the object representing the base.

6. A display control method executed by one or more computers, comprising:

acquiring first position information indicating a position of a base used for a take-off operation or a landing operation of an unmanned aerial vehicle;

acquiring second position information indicating a position of each of a plurality of unmanned aerial vehicles;

acquiring operating status information indicating an operating status of each of the plurality of unmanned aerial vehicles;

determining whether there is at least one unmanned aerial vehicle in flight outside the base among the plurality of unmanned aerial vehicles to be displayed displaying an object representing the base at a first coordinate position corresponding to the first position information on a two-dimensional map screen; and in a case where it is determined that there is no unmanned aerial vehicle in flight outside the base to be displayed:

displaying first vehicle information at a third coordinate position on the two-dimensional map screen so as not to overlap the object displayed at the first coordinate position, the third coordinate position being different from a second coordinate position corresponding to the second position information indicating a position of at least one unmanned aerial vehicle in the take-off operation or the landing operation among the plurality of unmanned aerial vehicles; and in a case where it is determined that there is at least one unmanned aerial vehicle in flight outside the base to be displayed:

displaying second vehicle information at a fourth coordinate position on the two-dimensional map screen, the fourth coordinate position corresponding to the second position information of an unmanned aerial vehicle in flight outside of the base of the plurality of unmanned aerial vehicles on the two-dimensional map screen, the fourth coordinate position being different than the first coordinate position and the third coordinate position, determining whether there is an information display range overlap between the unmanned aerial vehicle in flight outside the base and the unmanned aerial vehicle in take-off operation or landing operation, and in a case where it is determined that there is an information display range overlap, displaying the first vehicle information at a fifth coordinate position on the two-dimensional map screen so as not to overlap the object representing the base and the second vehicle information, the fifth coordinate position being different from the first coordinate position, the second coordinate position, the third coordinate position, and the fourth coordinate position, wherein:

first vehicle information and the second vehicle information are displayed in different display modes, the first vehicle information indicates the unmanned aerial vehicle in the take-off operation or the landing operation at the base, and the second vehicle information indicates the unmanned aerial vehicle in flight outside the base.

* * * * *